April 20, 1937.  A. SCHMID  2,078,027
MEASURING APPARATUS
Filed April 17, 1933   2 Sheets-Sheet 1
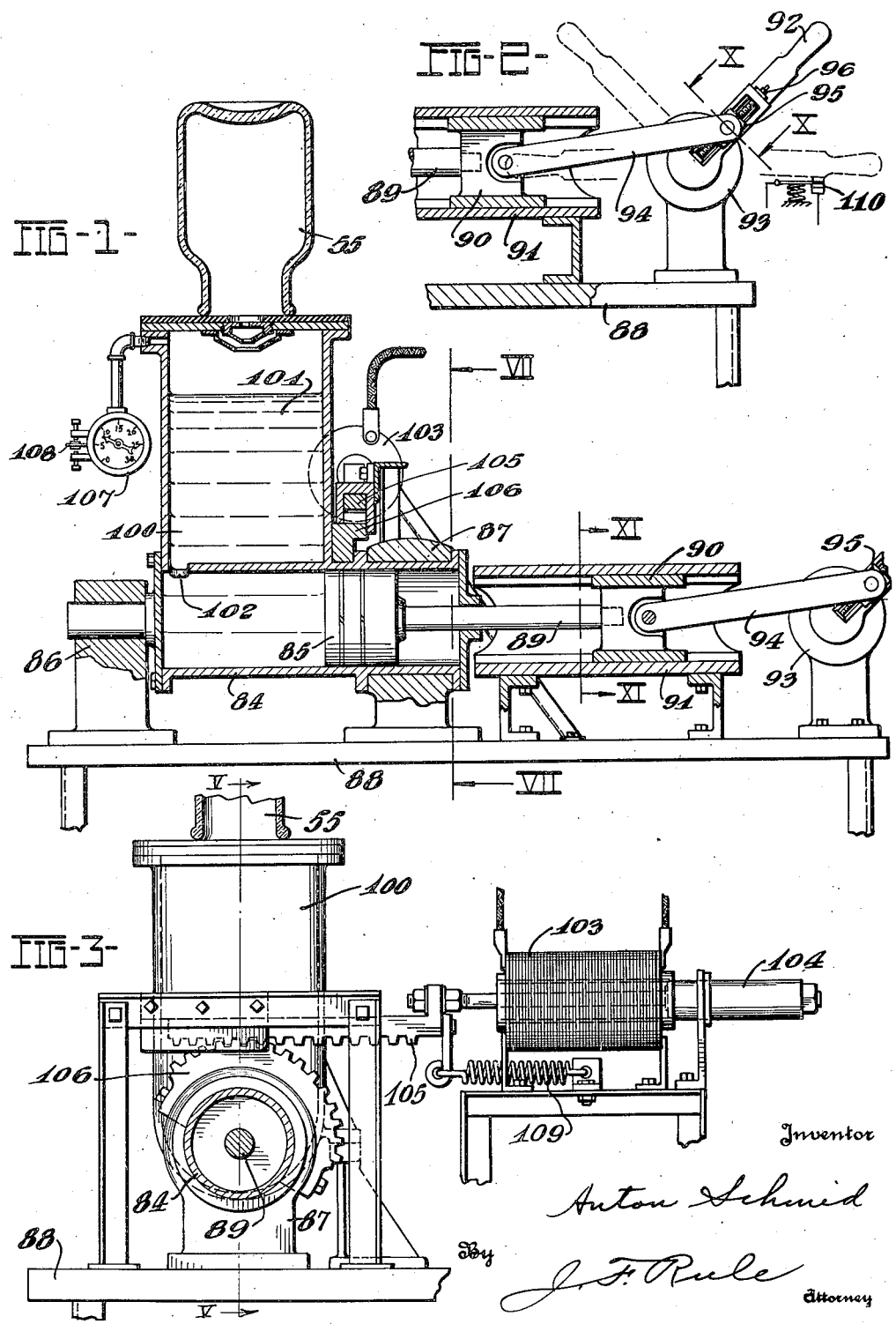

April 20, 1937. A. SCHMID 2,078,027
MEASURING APPARATUS
Filed April 17, 1933 2 Sheets-Sheet 2
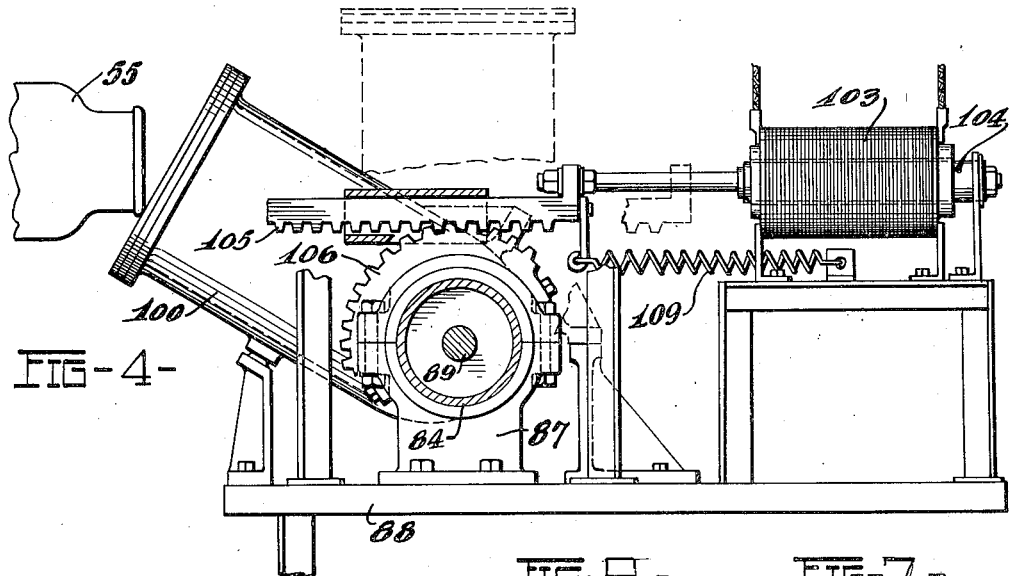
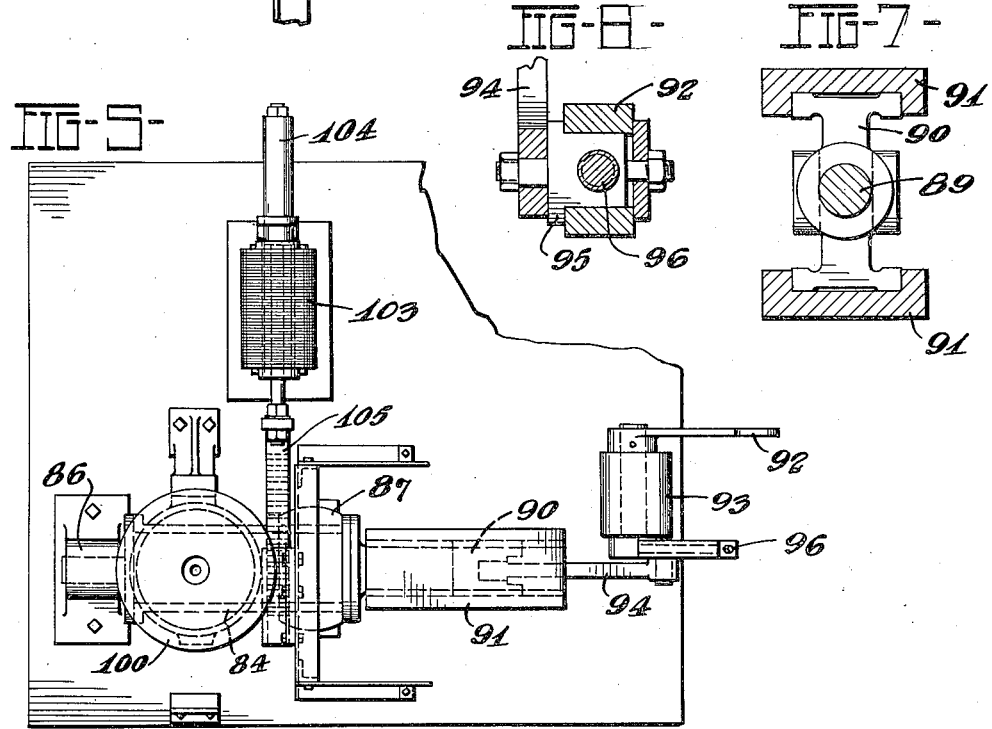
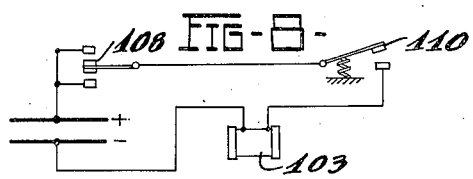
Inventor
Anton Schmid
By J. F. Rule
Attorney Patented Apr. 20, 1937

2,078,027

UNITED STATES PATENT OFFICE 2,078,027

MEASURING APPARATUS

Anton Schmid, Huntington, W. Va., assignor to Owens-Illinois Glass Company, a corporation of Ohio Application April 17, 1933, Serial No. 666,486

6 Claims. (Cl. 209—72)

My invention relates to apparatus for measuring the voluminal capacity of hollow articles and also the volume of solids.

An object of the invention is to provide an apparatus of the character indicated by which the capacity of articles such, for example, as bottles and jars, may be easily and accurately measured.

A further object of the invention is to provide apparatus which will selectively discard articles, the voluminal capacity of which does not come within predetermined limits.

Other objects of the invention will appear hereinafter.

In the accompanying drawings:

Figs. 1 to 8, inclusive, illustrate an apparatus which is adapted for measuring or testing the capacity of articles such, for example, as bottles for automatically discarding articles, the capacity of which does not come within certain prescribed limits.

Fig. 1 is a sectional elevation of the apparatus, the section being taken at the line V—V of Fig. 3.

Fig. 2 is a detail of a portion of the apparatus, showing particularly the means for adjusting the length of the piston stroke.

Fig. 3 is a sectional elevation at the line VII—VII on Fig. 1.

Fig. 4 is a view similar to Fig. 3, but showing the parts operated by the solenoid to discard an article.

Fig. 5 is a plan view of the apparatus.

Fig. 6 is a section at the line X—X on Fig. 2.

Fig. 7 is a section at the line XI—XI on Fig. 1.

Fig. 8 is a diagram of the electrical circuit for the solenoid.

Figs. 1 to 8 illustrate a modification including means for measuring the capacity of hollow articles and at the same time automatically discarding articles which do not come within prescribed limits of capacity. This apparatus includes an air pump comprising a horizontal cylinder 84 and piston 85. The cylinder has journal bearings in standards 86 and 87 permitting oscillating movement of the cylinder about a hortizontal axis. Said standards are mounted on a platform 88. A piston rod 89 connects the piston 85 with a cross head 90 which reciprocates in a bearing block 91 mounted on the platform 88. The piston is reciprocated by means of a hand lever 92 (Fig. 2) journaled to rock in a bearing 93. A connecting rod 94 is pivoted at one end to the cross head 90 and at its opposite end to an adjusting block 95 which has a screw threaded connection with an adjusting rod 96 mounted in the hand lever 92. By rotating said rod 96, the point of connection between the hand lever and connecting rod 94 can be adjusted lengthwise of the lever, thereby adjusting the length of stroke imparted to the piston 85 by operation of the hand lever.

A measuring tank 100 is mounted on or formed integral with the cylinder 84 so as to rock therewith. Water or other liquid 101 is contained within the tank 100 and within the cylinder 84 beneath the tank. An opening 102 provides communication between the tank and the cylinder. The tank 100 is normally in a vertical position in which it provides a support for the container 55, but may be rocked to the inclined position shown in Fig. 4 for discharging said container. The cylinder 84 and tank 100 are rocked by means of an electro-magnet 103 comprising an armature or core 104 connected to a rack 105 which meshes with a gear segment 106 attached to the cylinder 84. While the electro-magnet is deenergized, the parts remain in the Fig. 3 position in which the tank 100 is vertical. Upon energization of the magnet, the rack bar 105 is moved to the left against the tension of a coil spring 109, thereby rocking the tank to the Fig. 4 position. A vacuum gauge 107 indicates the degree of vacuum within the tank 100 and is also constructed to operate a switch 108 in the circuit of the magnet coil. A switch 110 (Figs. 2 and 8) is also included in circuit with the electro-magnet. The switch 110 is actuated by the hand lever 92 which closes the switch when said lever reaches the limit of its outward and downward movement, as indicated in broken lines in Fig. 2.

The operation of the apparatus shown in Figs. 1 to 8 is as follows: The hand lever 92 is first moved to the left (Fig. 2), thereby moving the piston 85 to the left hand end of the cylinder 84 (Fig. 1). The container 55 is now placed in position on the tank 100. The operator then moves the hand lever 92 to the right. This moves the piston 85 to the right hand end of its cylinder so that a portion of the liquid 101 is drawn downward from the tank 100, thus creating a partial vacuum within the container 55. The degree of vacuum is indicated on the gauge 107. If the vacuum does not exceed nor fall below the prescribed limits, the switch 108 is opened and held open by the gauge. The hand lever 92 as it completes its stroke, closes the switch 110. If the vacuum is either above or below the prescribed limits, the gauge 107 closes the switch 108, thereby completing a circuit through the electro-magnet, so that the latter is energized and operates to rock the tank 100 to the tilted position (Fig.

4) so that the container 55 is thrown off. The weight and momentum of the container are ordinarily sufficient to break the seal between the mouth of the container and its support, particularly when narrow neck containers are being tested. As the tank 100 completes its tilting movement it strikes a stop, arresting it with somewhat of a jolt which assists in breaking the seal. Where this is insufficient an obstruction may be placed in the path of the tilting container and operates positively to effect a movement of the container relative to its support, thereby restoring atmospheric pressure within the container. If the vacuum pulled by the operation of the hand lever is within the prescribed limits, the switch 108 is automatically opened before the hand lever closes the switch 110 and remains open, so that the electro-magnet is not energized. The tank 100 will, therefore, remain in its upright position and the container 55 will not be thrown off. If it is desired to measure the capacity of a container of a different size, the length of the piston stroke is correspondingly adjusted by means of the adjusting screw 96. Thus, if it is desired to measure the capacity of a comparatively large container, an adjustment is made to correspondingly increase the length of stroke of the piston, and vice versa.

Modifications may be resorted to within the spirit and scope of my invention.

What I claim is:

1. An apparatus for selectively determining the voluminal capacity of articles and discarding articles of a capacity outside of predetermined limits, said apparatus including a support for the articles, means for withdrawing a measured amount of air from the interior of a said article when mounted on the support and thereby producing a partial vacuum within the article, and means for discharging the article from said support when said degree of vacuum is outside of a predetermined limit.

2. An apparatus for selectively determining the voluminal capacity of articles and discarding articles of a capacity outside of predetermined limits, said apparatus including a support for the articles, means for withdrawing a measured amount of air from the interior of a said article when mounted on the support and thereby producing a partial vacuum within the article, and means for tilting said support when the degree of vacuum produced therein is above or below a predetermined limit.

3. An apparatus for selectively determining the voluminal capacity of articles and discarding articles of a capacity outside of predetermined limits, said apparatus including a support for the articles, means for withdrawing a measured amount of air from the interior of a said article when mounted on the support and thereby producing a partial vacuum within the article, means for tilting said support when the degree of vacuum produced therein is above or below a predetermined limit, and a gauge arranged to indicate the degree of vacuum in said article.

4. An apparatus for selectively determining the voluminal capacity of articles and discarding articles of a capacity outside of predetermined limits, said apparatus including a support for the articles, means for withdrawing a measured amount of air from the interior of a said article when mounted on the support and thereby producing a partial vacuum within the article, a vacuum gauge arranged to communicate with said article, an electro-motor, a switch in the motor circuit controlled by said gauge, and means actuated by the motor for discharging an article.

5. The combination of a piston motor comprising a horizontally disposed cylinder, a piston therein, a container for a liquid mounted on said cylinder, a liquid in said cylinder and container, said container providing a support for a hollow article, means providing communication between the interior of said container and the interior of the hollow article when the latter is mounted on said support, means for actuating the motor piston and thereby drawing liquid from the said container and producing a partial vacuum within the hollow article, said cylinder and container mounted for tilting movement about a horizontal axis, and automatic means for oscillating said cylinder and container and thereby discharging an article when the degree of vacuum produced therein falls outside of predetermined limits.

6. The combination of a piston motor comprising a horizontally disposed cylinder, a piston therein, a container for a liquid mounted on said cylinder, a liquid in said cylinder and container, said container providing a support for a hollow article, means providing communication between the interior of said container and the interior of the hollow article when the latter is mounted on said support, means for actuating the motor piston and thereby drawing liquid from the said container and producing a partial vacuum within the hollow article, said cylinder and container mounted for tilting movement about a horizontal axis, a gauge arranged to indicate the degree of vacuum produced within said article, an electro-motor, connections between said motor and said cylinder for rocking the cylinder and container about said axis, and a switch in the motor circuit controlled by said gauge.

ANTON SCHMID.